Figure 1:
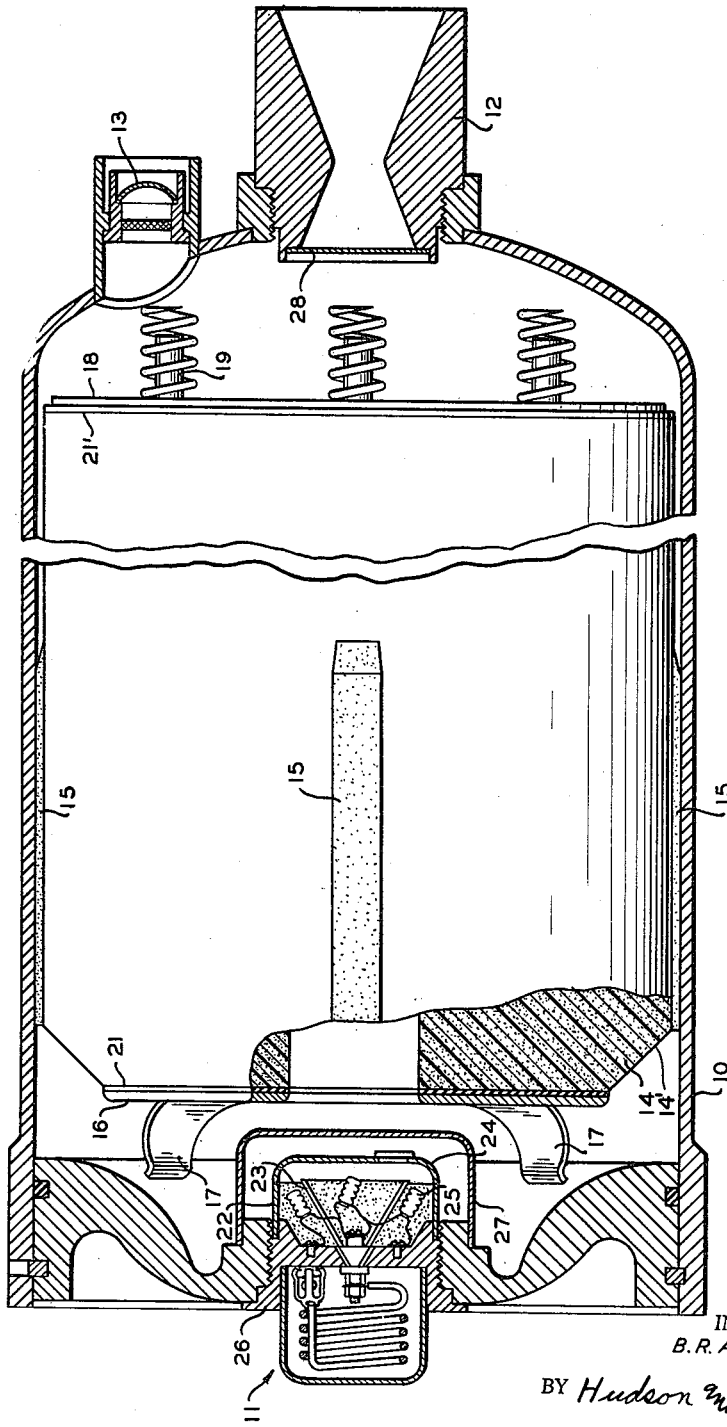

INVENTORS
B.R. ADELMAN
BY Hudson and Young
ATTORNEYS

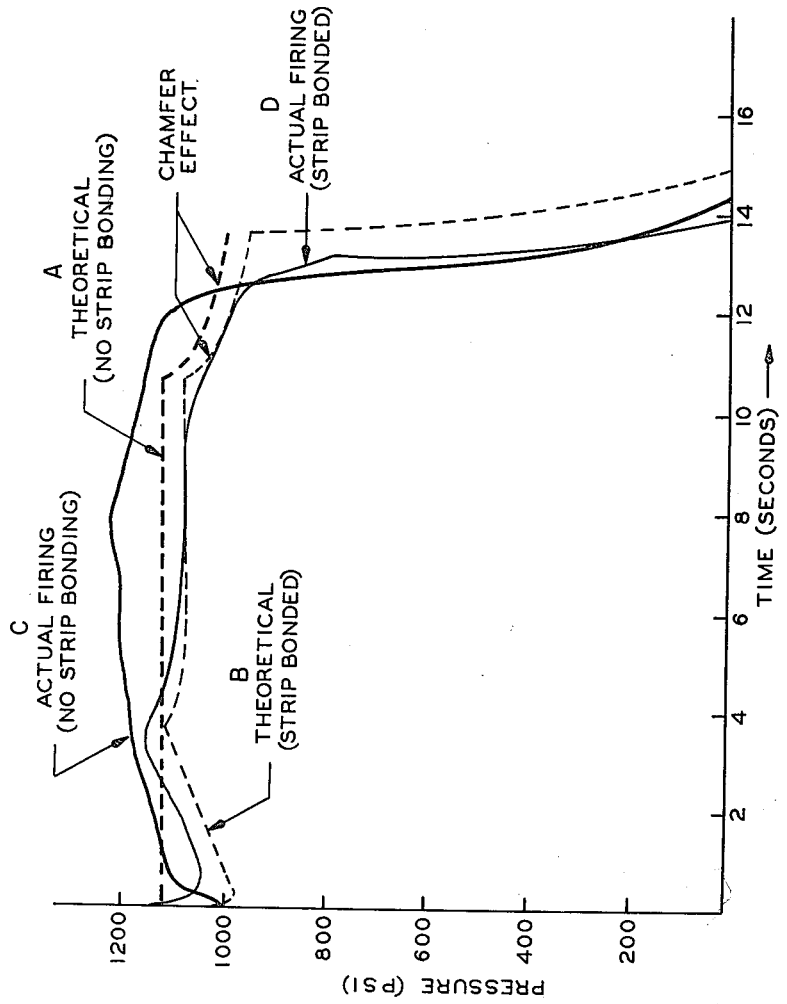

ured by Philips Petroleum Company.

United States Patent Office 3,077,734
Patented Feb. 19, 1963

3,077,734
SOLID-PROPELLANT ROCKET MOTOR
Barnet R. Adelman, Los Angeles, Calif., assignor to Phillips Petroleum Company, a corporation of Delaware
Filed Dec. 10, 1956, Ser. No. 627,497
4 Claims. (Cl. 60—35.6)

This invention relates to improved solid-propellant rocket motors. In one aspect this invention relates to an improved internal-external burning solid rocket propellant grain. Still another aspect of the invention relates to an improved solid propellant for a JATO (jet assisted take-off) unit. Still another aspect of the invention relates to a particular method for mounting a propellant grain in a rocket motor to take advantage of the improved propellant grain.

In early JATO units the propellant charge usually comprised a potted or case bonded, cigarette-burning grain which required a high-burning rate propellant. These earlier propellants were characterized by costly and difficult processing, smokey exhaust gases, and unpredictable performance resulting from increased burning surface due to undesirable cracks and fissures developed in the grain during handling.

Recently a superior solid propellant composition has been developed comprising a rubbery binder, an oxidizer, and a burning-rate catalyst. These propellants replaced the potted propellants, but were also of the cigarette-burning type and therefore required a high-burning rate. Since these propellants were not case bonded, they were more reliable, but they still entailed the other disadvantages mentioned above. Later, slower burning propellants were developed which have high mechanical strength and dependable slow burning rates making possible utilization of internal-external burning surface grains so that simultaneous ignition of these surfaces produces practically flat pressure-versus-time curves and results in superior performance in JATO units. Simultaneous and positive ignition of the external and internal surfaces has not always been obtained and as a result reliable firing has been elusive. It is believed that the interior surface alone does not provide enough burning surface to generate sufficient pressure to maintain combustion and as a result the rocket fails to fire unless the exterior surface is also properly ignited.

It is an object of this invention to provide an internal-external burning solid rocket propellant grain having improved ignition characteristics. It is another object of this invention to provide means for facilitating the simultaneous ignition of the internal surface and the external surface of a solid propellant grain. Another object of this invention is the provision of a solid propellant grain having improved firing characteristics. It is still another object of this invention to provide an improved rocket motor. Other and further objects and advantages of this invention will be apparent to one skilled in the art upon study of the following disclosure of the invention.

FIGURE 1 of the drawing is a sectional view of a rocket motor illustrating a preferred embodiment of my invention.

FIGURE 2 is a set of time-versus-pressure curves illustrating the beneficial results obtained by use of my invention.

Broadly the invention contemplates the provision of an internal-external burning rocket propellant grain having a chamfer formed on the outer edge of the end of the grain adjacent the igniter so as to facilitate the simultaneous ignition of the inner and outer surface of the propellant grain, coupled with partial restriction of the exterior grain surface to compensate for the added surface ignited by the chamfer. This configuration of the rocket grain is particularly applicable for use with the igniter described and claimed in my copending application Serial No. 490,760, filed February 28, 1955. This igniter comprises a cylinder of combustible material containing therein a cone of combustible material with the open end of the cone adjacent and parallel to the open end of the cylinder. This igniter is actuated by means of electric squibs imbedded within the combustible material or by resistance wires imbedded in the material which are heated to incandescence electrically. The ends of the grain are restricted with a slow burning rubbery or plastic composition and end plates with foot-like extensions are bonded to the restrictors. When assembled, the feet of the end plates contact the inner wall of the rocket case and thereby position the propellant in the case. It has been found that a severe drop during handling will often damage the end plates or the bond between the propellant and the end plates and could be the cause of a serious accident on subsequent firing of the JATO unit due to increased burning area of the propellant grain. In order to provide a more dependable anchorage and support for the propellant a plurality of strips of resilient material such as sponge rubber are bonded to the charge and to the case. These strips of resilient material are usually about half the length of the propellant grain and are attached, parallel with the longitudinal axis of the grain, adjacent the chamfered end of the grain. Four bonding strips are ordinarily used and are placed at 90° intervals around the periphery of the grain. A preferred means for applying these strips is disclosed and claimed in copending application Serial No. 566,507, filed February 20, 1956, by E. A. Westbrook and J. A. Sharp.

I have found that the provision of a chamfer on the outer edge of the ignited end of the grain ensures positive ignition of the exterior surface of the grain and results in reliable firing of the rocket. I have also found that strip bonding the grain to the motor case, as described, has provided improved firing characteristics of the rocket. Thus, the chamfer and the strip bonding coact to provide positive and improved firing of the propellant grain.

Rubbery binders include Thiokol, natural rubber, and butadiene-styrene copolymer. Solid oxidizers include ammonium perchlorate, ammonium guanidine, nitroguanidine, and ammonium nitrate.

While any of the rubbery binder and oxidizer combinations of the prior art may be used in these propellants, I prefer to use as an example of an improved JATO unit within the scope of this invention, a copolymer binder comprising butadiene-methylvinylpyridine with carbon black and metal oxide reinforcing fillers, a plasticizer, a curing agent, a cure accelerator, a wetting agent, an antioxidant and catalytic amounts of Milori blue, ammonium dichromate, ammonium molybdate, or the like. Propellants such as those described above, have burning rates in the range 0.1 to 0.25 inch per second when the JATO unit is operated in the pressure range of 600–1200 p.s.i.

which is considered a safe and practical operating range. Table I gives a specific example of such propellants with average data from burning many grains and strands in full scale and laboratory tests.

TABLE I

| Ingredients | phr. | Parts | Total Parts | Percent By Weight |
|---|---|---|---|---|
| Bd-MVP copolymer (90:10) 20 Mooney | 100 | | 11.093 | 10.88 |
| Furnace carbon black | 20 | | 2.218 | 2.17 |
| Di-butoxyethoxyethyl formal | 20 | | 2.218 | 2.17 |
| N,N-dimethyl-tert butylsulfenyl dithiocarbamate | 1 | 16.50 | 0.111 | 0.11 |
| Sulfur | 0.75 | | 0.083 | 0.08 |
| Zinc oxide | 3 | | 0.333 | 0.33 |
| Flexamine (Trademark)[1] | 3 | | 0.333 | 0.33 |
| Dioctyl ester of sodium sulfosuccinic acid | 1 | | 0.111 | 0.11 |
| Ammonium nitrate [2] | | 83.50 | 83.500 | 81.86 |
| Milori blue | | 2.00 | 2.000 | 1.96 |
| | | 102.00 | 102.000 | 100.00 |

[1] Physical mixture containing 25 percent of a complex diarylamine-ketone reaction product and 35 percent of N,N-diphenyl-para phenylenediamine.
[2] Grind to be made at 3,000 r.p.m., 0.094-inch HB screen, and 700 r.p.m. screw speed.

| Motor Data | | Laboratory Data | |
|---|---|---|---|
| $r_{(1000)}$, in./sec | 0.121 | $r_{(1000)}$, in./sec | 0.145 (Strand) |
| $r_{(500)}$, in./sec | 0.099 | $n$ | 0.49 (Strand) |
| $n$ | 0.57 | Young's modulus, p.s.i. | 4,100 |
| $c^*$, ft./sec | 4,064 | Ultimate tensile, p.s.i. | 220 |
| $d$, lb./cu. in | 0.0546 | Ultimate elongation, percent. | 9.7 |

A better understanding of the invention may be had by referring to the drawing and particularly to FIGURE 1 which represents a rocket motor comprising a case 10, an igniter indicated at 11, a nozzle 12, a safety diaphragm 13, and a propellant grain 14 having a chamfer 14' on the end adjacent the igniter. The grain is positioned in the case by the bonding strips 15, by end plate 16 having legs 17 and end plate 18 equipped with retaining springs 19. End plates 16 and 17 are bonded to the ends of the grain by a slow burning rubbery or plastic composition indicated at 21 and 21'.

The igniter 11 comprises a cylindrical cup 22 surrounding a conical cup 23, both of which are filled with an easily combustible material confined within the cups by a frangible and combustible material such as cardboard indicated at 24. The combustible material is ignited by squibs 25 which are imbedded in the combustible material. The cups are positioned upon the inner surface of a plug 26 which is threaded into the motor case. The squibs are ignited by electrical wires which have contacts extending through the plug. An impervious member 27 seals the interior of the rocket motor case when the igniter assembly is removed. Member 27 is also made of a frangible material such as wire screen covered with rubber. Diaphragm 28 seals the nozzle 12 and is burst upon ignition of the propellant grain.

The igniter assembly described and claimed in my copending application Serial No. 591,340 filed June 14, 1956, is also applicable for use with an internal-external burning grain having a chamfered end according to this invention. The igniter of my copending application has an ignition sustainer material positioned on the inner surface of the plug, corresponding to plug 26 of FIGURE 1, and a perforated, ignition material filled container attached to the inner face of the plug with means incorporated therein for igniting the material.

The chamfer on the end of the grain adjacent the igniter accomplishes rapid ignition of the exterior surface of the grain by facilitating passage of the flame from the igniter to the annulus between the grain and the rocket motor case. The chamfer on the grain provides a grain configuration which coacts with the igniter to accelerate ignition of the exterior surface of the grain. The chamfer is preferably formed at an angle of about 45° with respect to the end surface of the grain, however, the angle can be within the range of about 30 to 60°. The amount of chamfer preferably is such that the diameter of the chamfered end of the grain is about 0.8 that of the grain diameter, however, the chamfered end can be from 0.7 to 0.9 that of the grain diameter. The chamfer can be formed by cutting with a sharp blade, e.g., by means of a turning lathe or a milling machine.

The formation of a chamfer upon a rocket propellant grain necessitates a sacrifice of propellant, however, this sacrifice is justified by the improved ignition characteristics of a grain of this configuration.

The bonding strips should occupy from about 5 to about 10 percent of the total external surface of the grain, excluding the restricted ends. It is preferred that about 6 percent of the exterior surface be occupied by the bonding strips.

FIGURE 2 represents theoretical and actual time-versus-pressure curves relating to firing a solid rocket propellant grain in a rocket motor. The grains which were fired comprised propellants having a composition substantially as shown in Table I. The firings were made in a motor case similar to that shown in FIGURE 1. The case was secured firmly to a test stand. The firings were made according to conventional test procedures. Curve A represents the theoretical firing of a chamfered grain without strip bonding. Curve B represents the theoretical firing of a chamfered and strip bonded grain. Curve C resulted from the actual firing of a chamfered grain without strip bonding and shows a somewhat "rainbow" plateau which is believed to result from the increased exterior burning surface resulting from the improved ignition of the exterior surface by utilizing the chamfered grain. Curve D resulted from the actual firing of a chamfered, strip bonded grain and shows a plateau which more nearly corresponds to the theoretical curve. This is believed due to the restriction of the exterior surface obtained by the bonding strips. Curve D more nearly attains the ideal firing characteristics sought.

The curve D shows the improvement obtained by the combined effects of the chamfer on the grain and the bonding strips which act as restrictors on a portion of the exterior surface of the grain. The chamfer provides positive firing of the grain and the bonding strips provide control of the combustion of surface during the initial stages of the firing period. Burning rate is dependent upon pressure, at least in part, and the bonding strips provide control of the burning rate by controlling the amount of surface ignited, therefore controlling the pressure within the rocket motor.

Reasonable variations and modifications are possible within the scope of the disclosure of the present invention, the essence of which is the discovery that a chamfer on the outer edge of the ignited end of an internal-external burning solid propellant grain provides positive firing of the grain and that strip bonding the grain to the motor case provides improved firing characteristics to the chamfered grain.

That which is claimed is:
1. A rocket motor comprising a cylindrical case having one end closed and an exhaust nozzle positioned in the other end; an igniter centrally secured to one end of said case; a substantially cylindrical internal-external burning solid-propellant grain, having each end of the grain restricted, having one end chamfered on its external edge, wherein the chamfer is from about 30° to about 60° and the restricted, chamfered end is from about 0.7 to about 0.9 the diameter of the grain, positioned in said case with the chamfered end adjacent said igniter; and a plurality of slow-burning combustible material strips longitudinally attached to the side of said grain adjacent the chamfered end to compensate for the increased surface created by the chamfer and to bond said grain to said case.

2. A rocket motor comprising a cylindrical case having one end closed and an exhaust nozzle positioned in the other end; an igniter centrally secured to one end of said case; a substantially cylindrical internal-external burning solid-propellant grain, having each end of the grain restricted, having one end chamfered on its external edge, wherein the chamfer is about 45° and the diameter of the chamfered end is from about 0.7 to about 0.9 the diameter of the grain, positioned in said case with the chamfered end adjacent said igniter; and a plurality of sponge rubber strips bonding said grain to said case and covering about 5 to about 10 percent of the external surface of said grain to compensate for the increased surface created by the chamfer.

3. The method of improving the ignition characteristics of a substantially cylindrical, internal-external burning, end restricted, solid propellant grain for use in a rocket motor having an igniter secured to one end of the motor at its longitudinal axis, which method comprises forming a chamfer of about 30° to about 60° on the external edge of the grain adjacent the igniter so that the diameter of the restricted, chamfered end is about 0.7 to about 0.9 the diameter of the grain; and bonding the grain to the rocket motor with a plurality of slow-burning, resilient material strips longitudinally attached to the side of the grain adjacent the chamfered end to compensate for the increased surface created by the chamfer.

4. The method of claim 3 wherein the propellant grain comprises ammonium nitrate oxidant, a butadiene-methylvinylpyridine copolymer binder, and Milori blue as burning rate catalyst.

References Cited in the file of this patent

UNITED STATES PATENTS

| | | |
|---|---|---|
| 199,723 | Laidley | Jan. 29, 1878 |
| 2,479,470 | Carr | Aug. 16, 1949 |
| 2,515,048 | Lauritsen | July 11, 1950 |
| 2,549,005 | Preckel | Apr. 17, 1951 |
| 2,561,670 | Miller et al. | July 24, 1951 |
| 2,813,487 | Miller et al. | Nov. 19, 1957 |
| 2,937,493 | Adelman | May 24, 1960 |
| 2,970,046 | Cutforth | Jan. 31, 1961 |

FOREIGN PATENTS

| | | |
|---|---|---|
| 922,209 | France | Jan. 27, 1947 |
| 1,012,420 | France | Apr. 16, 1952 |
| 1,100,712 | France | Apr. 6, 1955 |
| 14,000 | Great Britain | July 2, 1908 |
| 26,430 | Great Britain | Nov. 29, 1907 |
| 516,865 | Great Britain | Jan. 12, 1940 |
| 746,214 | Great Britain | Mar. 14, 1956 |
| 153,146 | Sweden | Jan. 17, 1956 |